Nov. 14, 1967

R. J. CHARLES 3,352,007

METHOD FOR PRODUCING HIGH CRITICAL
FIELD SUPERCONDUCTING CIRCUITS

Filed Sept. 13, 1963

Inventor:
Richard J. Charles,
by Richard A. Spear
His Attorney.

United States Patent Office 3,352,007
Patented Nov. 14, 1967

3,352,007

METHOD FOR PRODUCING HIGH CRITICAL FIELD SUPERCONDUCTING CIRCUITS

Richard J. Charles, Schenectady, N.Y., assignor to General Electric Company, a corporation of New York Filed Sept. 13, 1963, Ser. No. 308,892
2 Claims. (Cl. 29—599)

This invention relates to superconductors and more particularly to a hard, high critical field superconductive body having high magnetization and exhibiting magnetic hysteresis when subjected to cyclically reversed magnetic fields and to a method for producing such a body.

While the existence of superconductivity in many metals, metal alloys and metal compounds has been known for many years, the phenomenon has been more or less treated as a scientific curiosity until comparatively recent times. The awakened interest in superconductivity may be attributed, at least in part, to technological advances in the arts where their properties would be extremely advantageous and to advances in cryogenics which removed many of the economic and scientific problems presented in obtaining and operating at very low temperatures.

As is well known, superconduction is a term describing the type of electrical current conduction existing in certain materials cooled below a critical temperature, $T_c$, where resistance to the flow of curernt is essentially nonexistent. Thus, a superconductive material, that is, any material having a critical temperature, $T_c$, below which normal resistance to the flow of electrical current is absent, can be subjected to an applied magnetic field when cooled below $T_c$ and a current will be induced therein. This current, even with the removal of the applied magnetic field, will theoretically continue for an infinite time and is therefore called "supercurrent" to distinguish it from the usual current present at temperatures above the critical temperature, $T_c$. In this connection, however, it should be noted that supercurrents will exist in those materials classified as "soft" superconductors only if a geometry is provided which has multiply-connected surfaces, as opposed to a simply-connected surface, and the applied magnetic field is below a critical magnetic field, $H_c$. A solid cylinder is an example of a simply-connected body, and a cylinder having an axial bore or a hollow sphere are examples of multiply-connected bodies. In the case of "hard" superconductors, supercurrents will exist without regard to the geometry of the body, since they are inherently multiply-connected. Here, assuming the low temperature requirement which is present in all cases, the applied magnetic field need only be below the critical field, $H_c$.

The terms "hard" and "soft," as applied to superconductors, originally referred principally to these physical properties of the materials. Subsequently, however, the terms have ordinarily been used when referring to the magnetic properties, although there is often a correlation between the physical and magnetic hardness and softness. As a general matter, it may now be assumed that a hard superconductive body is one wherein, either by virtue of composition or geometry, or both, the application of a subcritical magnetic field to it at temperatures below $T_c$ will result in magnetic flux being "trapped," that is, remaining even after the applied magnetic field has been removed. This so-called trapped flux actually derives from sustaining supercurrents created in the superconductive body by the applied magnetic field. Thus, a hard superconductive body is one in which irreversible magnetic effects are present. Stated slightly differently, a hard superconductive body will evidence magnetic hysteresis when subjected to a cyclically-reversed applied magnetic field.

Soft magnetically superconductive bodies are, by way of comparison, composed of materials which are not inherently magnetically hard and which have only a simply-connected surface. If a soft superconductive material is shaped in solid cylindrical form, the superconductive body is soft. If, on the other hand, the same soft material is shaped into hollow cylindrical form, the resulting superconductive body may be classified as hard, since it will trap flux.

The discussion thus far has omitted any reference to another factor which is to some degree responsible for the lack of use of superconductive bodies where the trapped magnetic flux is the element sought. This factor is the amount of supercurrent and contemporaneous trapped magnetic flux which can be obtained. The applied magnetic field to which a superconductive body is subjected begins to penetrate the skin or surface of the body and immediately creates a supercurrent which precludes the further penetration of the body. This is known as the Meissner effect. The depth of flux penetration that was felt to be possible in view of the Meissner effect was increased somewhat by the development of a theory by F. and H. London which states that the degree of flux penetration is a factor of the current density. The London theory envisioned current densities in a gross superconductor which decreased in magnitude from the outside toward the inside of the body. The result has been that the flux penetration depth of a given superconductive material is given in terms of the London penetration depth $\lambda$. However, since the penetration depth $\lambda$ is exceedingly small, for example, less than about 1000 A. in the best materials, it has not been possible to improve the quantity of trapped flux in gross superconductive bodies. An increase in the magnitude of the applied magnetic field does not extend the limit, since this limit is fixed at the critical field, $H_c$, which results in the creation of a critical current, $I_c$, in the surface of the superconductor and drives it normally resistive, or non-superconducting.

It has been found that hard superconductive bodies possess higher critical fields, $H_c$, than soft superconductive bodies and available evidence increasingly supports the proposition that the higher critical fields, and therefore higher current densities, are manifestations of the microstructure in hard superconductive bodies. Specifically, the magnetic properties of high critical field superconductors are felt to inhere from what may be described as a fine filamentary mesh which pervades the bodies. Such a mesh provides connectivity that has an extremely high multiplicity. Since the filaments are thinner than the penetration depths in a gross superconductive body, they will remain superconductive in the presence of externally applied magnetic fields which exceed the critical field of the gross superconductive body. This fact, of course, raises the critical current density, $J_c$, and enables larger currents to flow losslessly in the bodies.

The theory has recently been advanced that flux penetration in high critical field bodies differs from that for gross superconductors in that it is shown that penetration increases with a decrease in superconductor thickness or diameter. This is clearly indicated by the formula:

$$\lambda=\lambda_L\left(\frac{E_o}{D}\right)^{1/2}$$

where $\lambda$ is the penetration depth $\lambda_L$ is the London penetration depth $E_o$ is the coherence distance which ranges from about 1000 A. to 10,000 A., and D is the thickness of the superconductive filament.

The striking result of this theory is that the magnetization of a filamentary superconductor depends upon the macroscopic dimensions of the sample, this being a feature that was heretofore contraindicated.

It is a principal object of this invention to provide a synthetic high critical field body having superconduction circuits of selected configuration.

An additional object of this invention is to provide a high critical field superconductive body comprising a ceramic or glass matrix having superconductive circuits comprising filamentary pores which are filled with a material capable of being rendered superconductive.

Other objects and advantages of this invention will be in part obvious and in part explained by reference to the accompanying specification and drawings.

Figure 1:
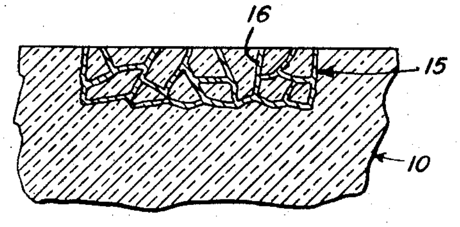
FIG. 1 is a greatly magnified fragmentary cross-sectional view of a portion of a body according to this invention showing the impregnated filamentary network.

Generally, the synthetic high critical field superconductive bodies of this invention comprise a ceramic matrix or base which has been suitably formed to provide an interconnecting filamentary porous network of preselected circuit configuration and in which the diameter or thickness of the pores does not exceed and preferably is much smaller than the London penetration depths $\lambda$ for a superconductive material which fills the porous network. As indicated earlier, the term "ceramic," as used in this application, also contemplates those materials which are classified as glasses, as well as materials such as mica, so that whenever the term "ceramic" is used subsequently it will be understood that glasses are also intended. Thus, a high critical field body having a preselected circuit configuration comprises a ceramic matrix 10 (FIG. 2) and a superconductive filamentary structure 11 which pervades a portion of it. The process of this invention broadly envisages providing a phase segregated ceramic body in which at least one phase is selectively removable to provide a filamentary porous network, removing the phase to form the network and then infusing the filaments with a superconductive material. The pore diameter should not exceed 1000 A. and it is highly preferred that it be substantially smaller, for example no greater than about 500 A. The entire assembly is then cooled to a temperature below the critical temperature, $T_c$, for the superconductive material.

Many diverse types of ceramic bodies may be used effectively to provide the interconnecting porous network, for example, bodies of extreme effectiveness can be obtained by preparing multiphase (phase segregated) ceramic compositions and then removing one or more of the phases to produce the filamentary network. This method of producing porous bodies enables the attainment of pore diameters of less than 1000 A., although it can also be used to obtain larger diameters. Additionally, it is possible that the basic ceramic ingredients may be compacted and fired according to existing ceramic techniques to obtain the required filamentary structure. Also, filamentary networks may be produced by nuclear bombardment and chemical etching of substances such as mica.

One ceramic structure which was found to be highly valuable is one produced by leaching the alkali oxide, boric oxide phase from a multiphase glassy ceramic composition consisting primarily of silica, alkali oxide and boron oxide, and possibly, but not necessarily, with a small amont of alumina. Generally, the silica and boron oxide account for at least 95 percent of the total composition with the silica generally being present in amounts of from about 70 and 85 percent. In this specific instance, the boron oxide and alkali oxide are removed by leaching in either dilute hydrochloric or dilute sulfuric acid, but it will be appreciated that other methods may be used in many situations. With the boron oxide phase removed, the interconnceting filamentary pore network constitutes a substantial proportion of the volume of the glass. By then impregnating this porous network with a superconductive material, a superconductive body is provided which is highly interconnected and has extremely high multiplicity. This latter feature, of course, makes it possible to obtain very high magnetization values. Several methods can be used to place superconducting material in the network, such as, for example, liquid or gaseous infusion, infusion and decomposition and so forth.

The $SiO_2$-$B_2O_3$ composition outlined provides several features which are highly advantageous. Notably, silica is a good electrical insulator. It may be drawn into fibers before leaching and perhaps even after impregnation with the superconductive material and the superconducting network can be caused to develop a fibrous texture in the direction if drawing which gives improved magnetic properties.

Figure 2:
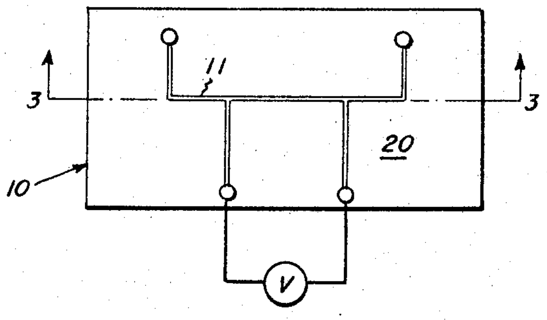
FIG. 2 is top elevation of a body having a circuit according to this invention.
Figure 3:
FIG. 3 is a section through the body of FIG. 2 taken along the line 3—3.

A porous ceramic body, such as that indicated by numeral 10 in FIG. 2, may be produced by providing a body 10 constructed of a phase segregated ceramic such as that set forth earlier and then chemically etching the body in areas corresponding to the circuit configuration desired, for the purpose of creating a filamentary interconnecting pore network in which the diameter of the individual filaments does not exceed about 1000 A.

The nature of the interconnecting pore network can best be seen by reference to FIG. 1 where numeral 15 represents an enlarged fragment of a portion of a body such as 10 taken from the area that was chemically etched. In FIG. 1, 16 represents the pore network which is comprised of interconnecting filaments whose diameters are not in excess of 1000 A. These pores are impregnated or infused with a quantity of a metal capable of being rendered superconductive, metals such as mercury, lead, indium, indium alloys, tin, cadmium, and lead-bismuth alloys being examples of those which are suitable for use. It will be appreciated that this list of metals is not intended to be exclusive but only illustrative of those which may be used.

Considering the process of this invention in more detail, a porous ceramic matrix containing 96 percent silica, balance boric oxide and aluminum oxide if desired can be molded into some preselected shape such as that indicated by the numeral 10 in FIG. 2, and this body then covered with a coating 20 of material which is resistant to a leaching agent or etchant that will remove at least one phase from this phase segregated ceramic. Portions of the coating 20 are then removed by suitable means, the means depending upon the particular coating used, so that a circuit of predetermined configuration is outlined on the surface of the ceramic body. Numeral 11 indicates one such circuit. After removal of the coating in the preselected areas, the entire body is then subjected to an etchant which removes at least one phase of the ceramic. In the case of the silica body referred to above, an etchant composed of either dilute hydrochloric or dilute sulfuric acid is operable to remove one of the phases. The coating may be a wax or wax-base composition, an organic plastic composition or any other organic or inorganic coating which resists dissolution by the acid. Coatings are available which are light sensitive so that the circuit may be outlined by photographic-like processes or the coating may be removed by mechanical abrading means.

After removal of the coating in the areas desired and upon removal of one or more of the segregated phases, the ceramic body is then infused with one of the superconductive materials. This infusion is best performed by enclosing the entire body within a pressure chamber, surrounding it with metal and then subjecting the metal to a pressure causing it to be forced into the interconnecting pore network. Preferably, the infusing metals are in molten condition when pressure is exerted. Generally speaking, pressures on the order of 40,000 to 60,000 p.s.i. will be adequate to impregnate the ceramic body with the molten metal.

The following table indicates the approximate impregnating temperature, critical temperature at which the material is rendered superconducting and the pressure which would normally be used to effect impregnation of a porous ceramic body having pore diameters of up to about 1000 A. In all cases, once the body has been impregnated with the superconducting material, it is cooled below the critical temperature for the particular superconductive mateial used.

| Metal | Impregnating Temp., ° C. | $T_c$-° K. | Impregnating Pressure |
|---|---|---|---|
| Lead | 360 | 7.2 | 60,000 |
| Indium | 200 | 3.4 | 50,000 |
| Tin | 270 | 3.7 | 50,000 |
| Lead-Bismuth | 140 | 7.9 | 50,000 |

Figure 4:
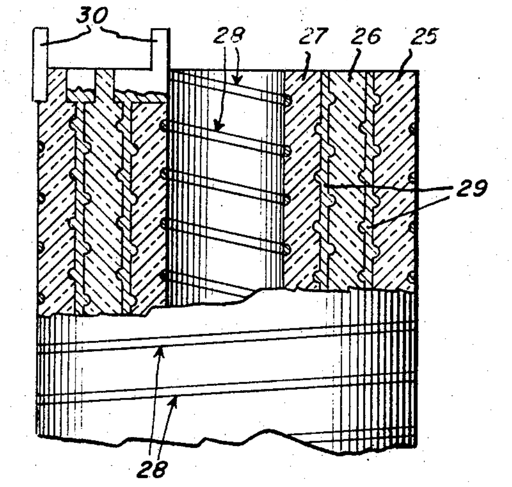
FIG. 4 is a cross-sectional view of a high critical field magnet produced by the present process.

FIG. 4 of the drawings illustrates a high critical field superconductive magnet produced in accordance with this invention. Specifically, a plurality of phase segregated ceramic bodies 25, 26 and 27 of cylindrical configuration, the cylinders being of different diameters so that they can be nested and still have separating spaces between adjacent walls of the cylinders, are coated with a material such as wax and the inner and outer walls are then scored along a spiral line to remove the acid resistance wax. Removal of the wax along spiral lines creates a coil-like current flow path. The cylinders are then subjected to a suitable acid aging agent which acts on the cylinders only along the spiral lines and removes one of the ceramic phases. Following removal of the phase, the cylinders are nested as shown in FIG. 4 and the composite body infused with a suitable superconductive material such as lead so that a continuous spiral current flow path is created through the etching away portions 28. The superconductive material in these paths consists of a filamentary structure so that high critical field properties are obtained even though the space 29 between the cylinders is filled with bulk lead. Due to the differences in the operating characteristics of bulk lead and the filamentary lead, the bulk lead is essentially an insulator under the operating conditions where the filamentary lead is superconducting. The spiral paths may be interconnected and connected to a source of external electrical current as by means of leads 30.

As the discussion earlier in the specification pointed out, superconductive bodies possessing the proper geometry can be magnetically hard, regardless of whether or not a magnetically hard or soft superconductive material is used. This is the case in this invention, since the interconnecting pore network, once impregnated with a superconductive material, provides the geometry necessary for the obtainment of a hard superconductive body. Since the diameters or thicknesses of the superconductive filaments are materially less than the London penetration depth $\lambda$ and in view of the fact that there is high multiplicity, it may be possible to achieve magnetization values many times higher than any which have previously been produced. Of course, it is advantageous to use a superconductive material which already possesses a high critical field since the combination of this material with a geometry which improves the magnetization will provide even higher magnetization values.

Although the present invention has been described in connection with preferred embodiments, it is to be understood that modifications and variations may be resorted to without departing from the spirit and scope of the invention, as those skilled in the art will readily understand. Such modifications and variations are considered to be within the purview and scope of the invention and the appended claims.

What I claim as new and desire to secure by Letters Patent of the United States is:

1. A process for producing high critical field superconducting circuits of preselected design comprising, providing a phase segregated ceramic body in which at least one phase is capable of selective removal to form a filamentary interconnecting pore network in which the diameter of the individual filaments comprising the network do not exceed about 1000 A., covering the ceramic body with an acid resistant coating, removing the acid resistant coating in areas corresponding to the circuit configuration desired, acid etching at least one phase from the phase segregated ceramic in the areas where the acid resistant coating was removed forming the interconnecting pore network, infusing a superconductive material into the pore network forming a superconducting network having high multiplicity, and cooling the body to a temperature below the critical temperature of the superconductive material used.

2. A process for producing high critical field superconducting magnets comprising, providing a plurality of phase segregated ceramic bodies of cylindrical configuration in which at least one phase is capable of removal to form a filamentary interconnecting pore network in which the diameter of the individual filaments does not exceed 1000 A., said cylinder being of different diameters so that they can be nested with spaces therebetween such that adjacent walls do not come into contact, covering the cylinders with an acid resistant coating along a spiral line on the inner and outer surfaces of each of the cylinders, acid etching at least one phase from the cylinders along the spiral paths where the acid resisting coating was removed to form the pore network, infusing a superconductive material into the spaces between the nested cylinders and into the pore network of the spirally etched areas forming a superconductive path having high multiplicity, and cooling the body to a temperature below the critical temperature of the superconductive material used.

References Cited

UNITED STATES PATENTS 3,214,249 10/1965 Bean et al. -------- 117—227 X

ALFRED L. LEAVITT, *Primary Examiner*.

WILLIAM L. JARVIS, *Examiner*.